(12) United States Patent
Oguro et al.

(10) Patent No.: US 11,577,731 B2
(45) Date of Patent: Feb. 14, 2023

(54) MOVING BODY CONTROL APPARATUS, MOVING BODY, AND MOVING BODY CONTROL METHOD

(71) Applicant: HONDA MOTOR CO., LTD., Tokyo (JP)

(72) Inventors: Chihiro Oguro, Wako (JP); Nozomu Hirosawa, Wako (JP); Daichi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 167 days.

(21) Appl. No.: 17/199,993

(22) Filed: Mar. 12, 2021

(65) Prior Publication Data

US 2021/0284166 A1 Sep. 16, 2021

(30) Foreign Application Priority Data

Mar. 16, 2020 (JP) .............................. JP2020-044956

(51) Int. Cl.
*B60W 10/04* (2006.01)
*B60W 10/18* (2012.01)
(Continued)

(52) U.S. Cl.
CPC .. *B60W 30/18163* (2013.01); *B60W 30/0956* (2013.01); *B60W 30/143* (2013.01); *B60W 40/04* (2013.01); *B60W 2554/804* (2020.02)

(58) Field of Classification Search
CPC ....... B60W 30/18163; B60W 30/0956; B60W 30/143; B60W 40/04; B60W 2554/804; B60W 2420/42; B60W 2420/52; B60W 2556/50; B60W 30/09; B60W 30/16; B60W 2050/146; B60W 10/04; B60W 10/18; B60W 50/14; B60W 10/20; B60W 40/02; B60W 2050/143
(Continued)

(56) References Cited

U.S. PATENT DOCUMENTS 9,718,473 B2 8/2017 Suzuki
2017/0008531 A1* 1/2017 Watanabe ....... B60W 30/18163
(Continued)

FOREIGN PATENT DOCUMENTS

JP 2019-020345 A 2/2019
WO 2015/052865 A1 4/2015

OTHER PUBLICATIONS

Office Action dated Jan. 18, 2022 issued over the corresponding Japanese Patent Application No. 2020-044956 A with the English translation thereof.

*Primary Examiner* — Abby Y Lin
*Assistant Examiner* — Hossam M Abd El Latif
(74) *Attorney, Agent, or Firm* — Carrier Shende & Associates, P.C.; Joseph P. Carrier; Fulchand P. Shende

(57) ABSTRACT

A moving body control apparatus includes a travel control section that controls travel of a moving body based on vicinity information, and a lane change control section that performs a lane change of the moving body from a first lane to a second lane, if the lane change of the moving body from the first lane to the second lane is approved. The travel control section performs first acceleration/deceleration control to accelerate or decelerate the moving body according to a velocity of another moving body travelling in the second lane, if the lane change of the moving body from the first lane to the second lane is denied.

9 Claims, 3 Drawing Sheets

(51) Int. Cl.
*B60W 10/20* (2006.01)
*B60W 30/09* (2012.01)
*B60W 30/095* (2012.01)
*B60W 30/14* (2006.01)
*B60W 30/16* (2020.01)
*B60W 30/18* (2012.01)
*B60W 40/02* (2006.01)
*B60W 40/04* (2006.01)
*B60W 50/14* (2020.01)

(58) Field of Classification Search
USPC .......................................................... 701/41
See application file for complete search history.

(56) References Cited

U.S. PATENT DOCUMENTS

| 2018/0057002 | A1* | 3/2018 | Lee | B60W 60/00276 |
| 2018/0065627 | A1* | 3/2018 | Ohmura | B60W 30/08 |
| 2018/0126985 | A1* | 5/2018 | Lee | B60W 50/082 |
| 2019/0143983 | A1* | 5/2019 | Hashimoto | B60W 10/20 |
| | | | | 701/23 |

* cited by examiner

MOVING BODY CONTROL APPARATUS, MOVING BODY, AND MOVING BODY CONTROL METHOD

CROSS-REFERENCE TO RELATED APPLICATION

This application is based upon and claims the benefit of priority from Japanese Patent Application No. 2020-044956 filed on Mar. 16, 2020, the contents of which are incorporated herein by reference.

BACKGROUND OF THE INVENTION

Field of the Invention

The present invention relates to a moving body control apparatus, a moving body, and a moving body control method.

Description of the Related Art

Japanese Laid-Open Patent Publication No. 2019-020345 discloses, when a vehicle travels through a point that is beyond a point a prescribed distance before a start point of the next region in which a lane change is not possible, cancelling a lane change assistance process or performing the lane change assistance process on a condition that the vehicle decelerates.

SUMMARY OF THE INVENTION

However, in Japanese Laid-Open Patent Publication No. 2019-020345, it is not always possible to accurately perform the lane change.

The present invention has the objective of providing a moving body control apparatus, a moving body, and a moving body control method that make it possible to accurately perform a lane change.

A moving body control apparatus according to one aspect of the present invention is a moving body control apparatus comprising a vicinity information acquiring section that acquires vicinity information of a moving body; a travel control section that controls travel of the moving body based on the vicinity information; a judging section that judges whether to approve or deny a lane change of the moving body from a first lane in which the moving body is travelling to a second lane adjacent to the first lane, based on the vicinity information; and a lane change control section that performs the lane change of the moving body from the first lane to the second lane, if the lane change of the moving body from the first lane to the second lane is approved, wherein the travel control section performs first acceleration/deceleration control to accelerate or decelerate the moving body according to a velocity of another moving body travelling in the second lane, if the lane change of the moving body from the first lane to the second lane is denied.

A moving body according to another aspect of the present invention comprises the moving body control apparatus such as described above.

A moving body control method according to yet another aspect of the present invention comprises a travel control step of controlling travel of a moving body based on vicinity information of the moving body; a judgment step of judging, based on the vicinity information of the moving body, whether to approve or deny a lane change of the moving body from a first lane in which the moving body is travelling to a second lane adjacent to the first lane; and a lane change control step of performing the lane change of the moving body from the first lane to the second lane, if the lane change of the moving body from the first lane to the second lane is approved in the judging step, wherein, in the travel control step, first acceleration/deceleration control to accelerate or decelerate the moving body according to a velocity of another moving body travelling in the second lane is performed, if the lane change of the moving body from the first lane to the second lane is denied in the judging step.

According to the present invention, it is possible to provide a moving body control apparatus, a moving body, and a moving body control method that can accurately perform a lane change.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Preferred embodiments of a moving body control apparatus, a moving body, and a moving body control method according to the present invention will be presented and described below with reference to the accompanying drawings.

Embodiment

Figure 1:
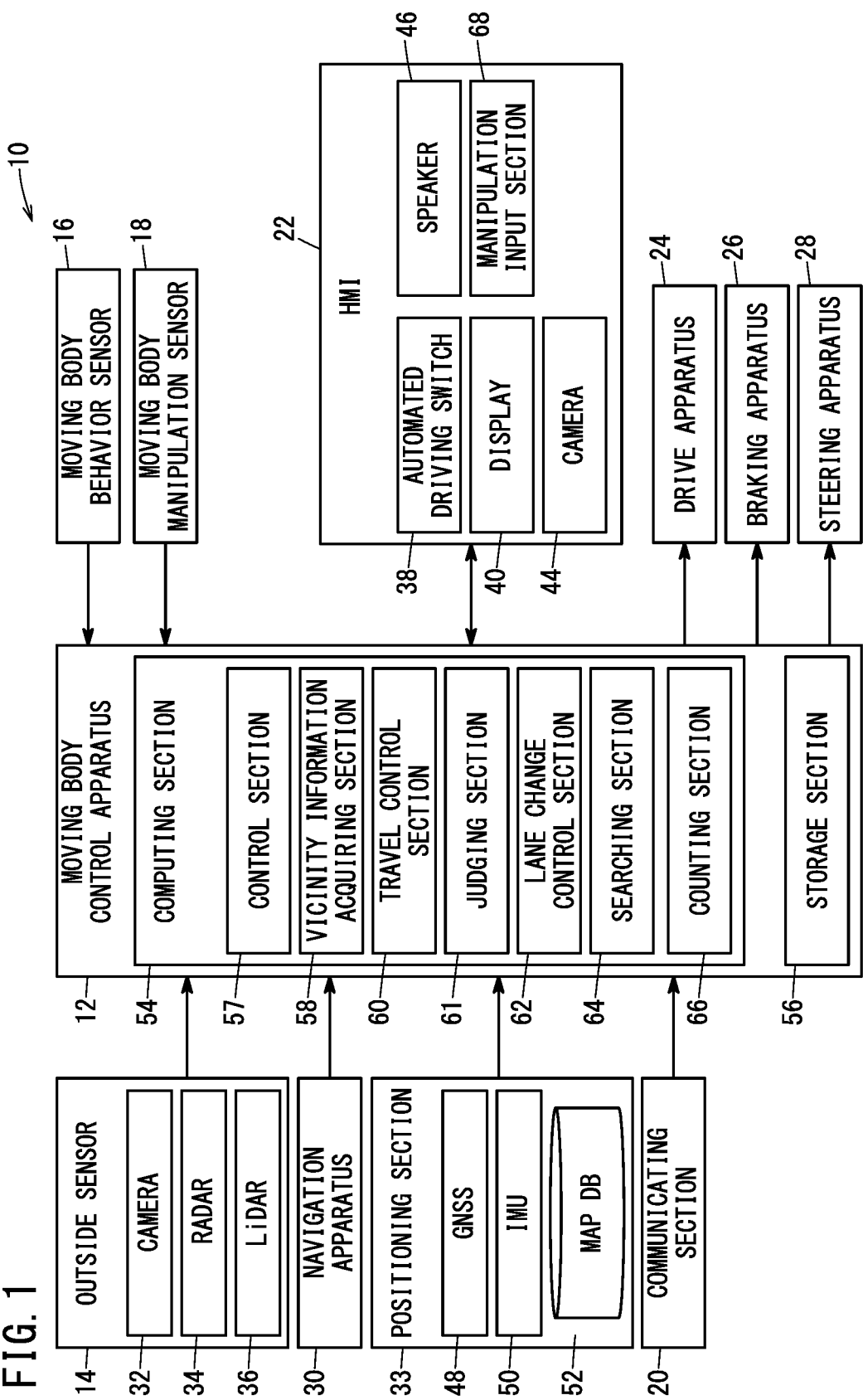
FIG. 1 is a block diagram showing a moving body including a moving body control apparatus according to an embodiment.

A moving body control apparatus, a moving body, and a moving body control method according to an embodiment will be described using drawings. FIG. 1 is a block diagram showing a moving body that includes a moving body control apparatus according to the present embodiment. Here, an example is described of a case in which a moving body 10 is a vehicle, but the moving body 10 is not limited to being a vehicle. For example, the moving body 10 may be a robot or the like.

The moving body 10 includes a moving body control apparatus 12, i.e. a moving body control ECU (Electronic Control Unit). The moving body 10 further includes an outside sensor 14, a moving body behavior sensor 16, a moving body manipulation sensor 18, a communicating section 20, and an HMI (Human-Machine Interface) 22. The moving body 10 also includes a drive apparatus 24, a braking apparatus 26, a steering apparatus 28, a navigation apparatus 30, and a positioning section 33. The moving body 10 includes configurational elements other than the above configurational elements, but descriptions thereof are omitted.

The outside sensor 14 acquires outside information, which is information concerning the area around the moving body 10. The outside sensor 14 includes a plurality of cameras 32 and a plurality of radars 34. The outside sensor 14 also includes a plurality of LiDARs (Light Detection And Ranging, Laser Imaging Detection And Ranging) 36.

The information acquired by the cameras (imaging section) 32, i.e. camera information, is supplied from the cameras 32 to the moving body control apparatus 12. The camera information is captured image information, for example. The camera information forms outside information, together with the radar information and LiDAR information described further below. In FIG. 1, only one camera 32 is shown, but a plurality of cameras 32 are actually included.

Each radar 34 emits a transmission wave toward the outside of the moving body 10, and receives a reflected wave that comes back to the radar 34 when a portion of the emitted transmission wave is reflected by a detection object. The transmission wave may be an electromagnetic wave or the like, for example. The electromagnetic wave is a millimeter wave or the like, for example. The detection object is another moving body 70A to 70F (see FIG. 2A) that is different from the moving body 10, i.e. another vehicle or the like. The radar 34 generates radar information (reflected wave signal) based on the reflected wave or the like. The radar 34 supplies the generated radar information to the moving body control apparatus 12. In FIG. 1, one radar 34 is shown, but a plurality of radars 34 are actually included in the moving body 10. The radars 34 are not limited to being millimeter wave radars. As an example, ultrasonic sensors or the like may be used as the radars 34.

Each LiDAR 36 continuously emits a laser in all directions from the moving body 10, measures the three-dimensional position of a reflection point based on reflected waves resulting from the emitted laser, and outputs information concerning this three-dimensional position, i.e. three-dimensional information. The LiDAR 36 supplies this three-dimensional information, i.e. LiDAR information, to the moving body control apparatus 12. In FIG. 1, one LiDAR 36 is shown, but a plurality of LiDARs 36 are actually included in the moving body 10.

The moving body behavior sensor 16 acquires information concerning the behavior of the moving body 10, i.e. moving body behavior information. The moving body behavior sensor 16 includes a velocity sensor (not shown in the drawings), a wheel velocity sensor (not shown in the drawings), an acceleration sensor (not shown in the drawings), and a yaw rate sensor (not shown in the drawings). The velocity sensor detects the velocity of the moving body 10, i.e. the vehicle velocity. Furthermore, the velocity sensor detects the progression direction of the moving body 10. The wheel velocity sensor detects the velocity of the vehicle wheels (not shown in the drawings), i.e. the wheel velocity. The acceleration sensor detects the acceleration of the moving body 10. The acceleration includes the forward-rear acceleration, the lateral acceleration, and the up-down acceleration. It is acceptable for acceleration in only some of these directions to be detected by the acceleration sensor. The yaw rate sensor detects the yaw rate of the moving body 10.

The moving body manipulation sensor (driving manipulation sensor) 18 acquires information concerning driving manipulations made by an occupant (driver), i.e. driving manipulation information. The moving body manipulation sensor 18 includes an acceleration pedal sensor (not shown in the drawings), a brake pedal sensor (not shown in the drawings), a steering angle sensor (not shown in the drawings), and a steering torque sensor (not shown in the drawings). The acceleration pedal sensor detects the manipulation amount of an acceleration pedal (not shown in the drawings). The brake pedal sensor detects the manipulation amount of a brake pedal (not shown in the drawings). The steering angle sensor detects the steering angle of a steering wheel (not shown in the drawings. The steering torque sensor detects the steering torque applied to the steering torque.

The communicating section 20 performs wireless communication with an external device (not shown in the drawings). The external device can include an external server or the like (not shown in the drawings), for example. The communicating section 20 may be capable or incapable of being attached to and detached from the moving body 10. Examples of the communicating section 20 that is capable of being attached to and detached from the moving body 10 include a mobile telephone, a smartphone, and the like.

The HMI 22 receives the manipulation input made by an occupant, and visually, audibly, or tactilely provides the user with various types of information. The HMI 22 includes an automated driving switch (driving assistance switch) 38, a display 40, a camera 44, a speaker 46 and a manipulation input section 68.

The automated driving switch 38 is a switch with which the occupant issues instructions to start and stop automated driving. The automated driving switch 38 includes a start switch (not shown in the drawings) and a stop switch (not shown in the drawings). The start switch outputs a start signal to the moving body control apparatus 12, in response to a manipulation by the occupant. The stop switch outputs a stop signal to the moving body control apparatus 12, in response to a manipulation by the occupant.

The display (display section) 40 includes a liquid crystal display, organic EL display, or the like, for example. Here, an example is described of a case in which the display 40 is a touch panel, but the display 40 is not limited to this.

The camera 44 captures an image of the inside of the moving body 10, i.e. the inside of the vehicle cabin (not shown in the drawings). Furthermore, the camera 44 can be provided to capture an image of the occupant. The camera 44 may be provided on the dashboard (not shown in the drawings) or on the ceiling (not shown in the drawings), for example. The camera 44 outputs information acquired by capturing the image inside the vehicle cabin, i.e. image information, to the moving body control apparatus 12.

The speaker 46 provides the occupant with various types of information using sound. The moving body control apparatus 12 outputs various notifications, warnings, and the like using the speaker 46.

The manipulation input section 68 enables the occupant to perform manipulation input to issue instructions for a lane change. In a case where a lane change proposal is made by the moving body control apparatus 12, the occupant can indicate whether they agree with this lane change proposal by using the manipulation input section 68. The manipulation input section 68 is a lever-shaped manipulator (not shown in the drawings) for example, but is not limited to this. The manipulation input section 68 is provided on a steering column (not shown in the drawings), for example, but is not limited to this. The manipulation input section 68 can pivot clockwise and counter-clockwise centered on a support shaft, for example. The manipulation input section 68 includes a manipulation position sensor (not shown in the drawings). The manipulation position sensor detects a manipulation position of the manipulation input section 68. The manipulation input section 68 supplies information acquired by the manipulation position sensor, i.e. information concerning the manipulation position of the manipulation input section 68, to the moving body control apparatus 12 described further below.

The drive apparatus (drive force control system) 24 includes a drive ECU (not shown in the drawings) and a drive source (not shown in the drawings). The drive ECU controls the drive force (torque) of the moving body 10 by controlling the drive source. The drive source can be an engine, a drive motor, or the like, for example. The drive ECU can control the drive force by controlling the drive source, based on manipulation of the acceleration pedal performed by the occupant. Furthermore, the drive ECU can control the drive force by controlling the drive source based on instructions supplied from the moving body control apparatus 12. The drive force of the drive source is transmitted to the vehicle wheels (not shown in the drawings) via a transmission or the like (not shown in the drawings).

The braking apparatus (braking force control system) 26 includes a braking ECU (not shown in the drawings) and a braking mechanism (not shown in the drawings). The braking mechanism causes a braking member to operate using a brake motor, hydraulic mechanism, or the like. The braking ECU can control the braking force by controlling the braking mechanism based on a manipulation of the brake pedal made by the occupant. Furthermore, the braking ECU can control the braking force by controlling the braking mechanism based on instructions supplied from the moving body control apparatus 12.

The steering apparatus (steering system) 28 includes a steering ECU (not shown in the drawings), i.e. an EPS (Electric Power Steering) system ECU, and a steering motor (not shown in the drawings). The steering ECU controls the orientation of the wheels (steered wheels) by controlling the steering motor based on a manipulation of the steering wheel, performed by the occupant. Furthermore, the steering ECU controls the orientation of the wheels by controlling the steering motor based on instructions supplied from the moving body control apparatus 12. The steering may be performed by changing the torque distribution and the braking force distribution among the left and right wheels.

The navigation apparatus 30 includes a GNSS (Global Navigation Satellite System) sensor (not shown in the drawings). Furthermore, the navigation apparatus 30 includes a computing section (not shown in the drawings) and a storage section (not shown in the drawings). The GNSS sensor detects the current position of the moving body 10. The computing section reads map information corresponding to the current position detected by the GNSS sensor, from a map database stored in the storage section. The computing section determines a target route from the current position to a destination, using this map information. The destination is input by the occupant via the HMI 22. As described above, the display 40 is a touch panel. The input of the destination is performed by having the occupant manipulate the touch panel. The navigation apparatus 30 outputs the created target route to the moving body control apparatus 12. The moving body control apparatus 12 supplies this target route to the HMI 22. The HMI 22 displays this target route in the display 40.

The positioning section 33 includes a GNSS 48. The positioning section 33 further includes an IMU (Inertial Measurement Unit) 50 and a map database (map DB) 52. The positioning section 33 identifies the position of the moving body 10 using information acquired by the GNSS 48, information acquired by the IMU 50, and the map information stored in the map database 52. The positioning section 33 can supply the moving body control apparatus 12 with self position information that is information indicating the position of the moving body 10, i.e. position information of the moving body 10. Furthermore, the positioning section 33 can supply the moving body control apparatus 12 with the map information.

The moving body control apparatus 12 includes a computing section 54 and a storage section 56. The computing section 54 performs overall control of the moving body control apparatus 12. The computing section 54 can be formed by one or more processors, for example. A CPU (Central Processing Unit) or the like can be used as these processors, for example. The computing section 54 performs the moving body control by controlling each section based on a program stored in the storage section 56.

The computing section 54 includes a control section 57, a vicinity information acquiring section 58, a travel control section 60, a judging section 61, a lane change control section 62, a searching section 64, and a counting section 66. The control section 57, the vicinity information acquiring section 58, the travel control section 60, the judging section 61, the lane change control section 62, the searching section 64, and the counting section 66 can be realized by having the computing section 54 execute a program stored in the storage section 56.

The storage section 56 includes a volatile memory (not shown in the drawings) and a non-volatile memory (not shown in the drawings). The volatile memory can be a RAM (Random Access Memory) or the like, for example. The non-volatile memory can be a ROM (Read Only Memory), a flash memory, or the like, for example. The outside information, the moving body behavior information, the driving manipulation information, and the like are stored in the volatile memory, for example. Programs, tables, maps, and the like are stored in the non-volatile memory, for example.

The control section 57 performs overall control of the moving body control apparatus 12.

The vicinity information acquiring section 58 can acquire vicinity information of the moving body 10. This vicinity information can be supplied from the outside sensor 14, for example.

The travel control section 60 can control the travel of the moving body 10. More specifically, the travel control section 60 can control the travel of the moving body 10 based on the vicinity information acquired by the vicinity information acquiring section 58.

The judging section 61 can judge whether to approve or deny a lane change. More specifically, the judging section 61 can judge whether to approve or deny the lane change of the moving body 10 from a first lane 72A (see FIG. 2A), in which the moving body 10 is travelling, to a second lane 72B (see FIG. 2A), which is adjacent to the first lane 72A, based on the vicinity information.

The lane change control section 62 can control lane changing of the moving body 10. When the lane change of the moving body 10 from the first lane 72A to the second lane 72B is approved, i.e. allowed, by the judging section 61, the lane change control section 62 can perform the lane change of the moving body 10 from the first lane 72A to the second lane 72B. The lane change control section 62 can make a lane change proposal to the occupant and perform a lane change if this lane change proposal is accepted by the occupant, but the present invention is not limited to this. The lane change control section 62 may automatically perform a lane change without making a lane change proposal to the occupant. Furthermore, a lane change may be performed based on lane change instructions provided by the occupant.

When a lane change is to be performed, the lane change control section 62 can provide the occupant with information indicating that a lane change will be performed, using the display 40, the speaker 46, and the like, for example. While the lane change control is being performed, if there is a situation in which it is necessary to interrupt this lane change, the lane change control section 62 performs control to interrupt the lane change. In such a case, the moving body 10 returns to a state of travelling in the first lane 72A.

When the lane change of the moving body 10 from the first lane 72A to the second lane 72B is denied by the judging section 61, the travel control section 60 can perform first acceleration/deceleration control to increase or decrease the velocity v1 of the moving body 10 according to the velocity v2 of another moving body 70 travelling in the second lane 72B. That is, when the judging section 61 does not permit the lane change of the moving body 10 from the first lane 72A to the second lane 72B, the travel control section 60 can perform the first acceleration/deceleration control to increase or decrease the velocity v1 of the moving body 10 according to the velocity v2 of the other moving body 70 travelling in the second lane 72B. In the first acceleration/deceleration control, for example, the velocity v1 of the moving body 10 is controlled to become less than the velocity v2 of the other moving body 70 travelling in the second lane 72B by a prescribed velocity difference Δv. As an example, the velocity v1 of the moving body 10 is controlled to become less than the velocity v2 of another moving body 70 located at the shortest distance from the moving body 10 among a plurality of other moving bodies 70 travelling in the second lane 72B, by the prescribed velocity difference Δv. The judgment as to whether to approve or deny the lane change can be performed by the judging section 61 while the first acceleration/deceleration control is being performed by the travel control section 60. Here, an example is described of a case in which the velocity v1 of the moving body 10 is controlled to become less than the velocity v2 of the other moving body 70 by the prescribed velocity difference Δv, but the present invention is not limited to this. Instead, the velocity v1 of the moving body 10 may be controlled to become greater than the velocity v2 of the other moving body 70 travelling in the second lane 72B by the prescribed velocity difference Δv.

The searching section 64 can search for an empty space 74 (see FIG. 2A) for making the lane change of the moving body 10 from the first lane 72A to the second lane 72B, based on the vicinity information. The judging section 61 can judge whether to approve or deny the lane change of the moving body 10 from the first lane 72A to the second lane 72B based on the search results for the empty space 74 performed by the searching section 64.

When the judging section 61 has approved the lane change of the moving body 10 from the first lane 72A to the second lane 72B, the lane change control section 62 can perform second acceleration/deceleration control to position the moving body 10 in the empty space 74 detected by the searching section 64.

The counting section 66 can accumulate elapsed time. When the first acceleration/deceleration control is started by the travel control section 60, the counting section 66 transitions from a disabled state to an enabled state. When the counting section 66 transitions from the disabled state to the enabled state, a count of the elapsed time by the counting section 66 is started. After this, when the first acceleration/deceleration control is suspended, the counting section 66 transitions from the enabled state to the disabled state. When the counting section 66 transitions from the enabled state to the disabled state, the count of the elapsed time is suspended. After this, when the first acceleration/deceleration control is restarted, the counting section 66 transitions from the disabled state to the enabled state. When the first acceleration/deceleration control is restarted, a count value is added to the count value obtained before the counting section 66 entered the disabled state. In other words, the counting section 66 can accumulate the elapsed time. When the elapsed time accumulated by the counting section 66 reaches a prescribed time, the lane change control section 62 cancels the lane change of the moving body 10 from the first lane 72A to the second lane 72B.

When deceleration of the moving body 10 is performed in the first acceleration/deceleration control performed before the lane change is started and the lane change that has been started is then suspended, the travel control section 60 can perform control to decelerate the moving body 10 in the first acceleration/deceleration control that is performed after the suspension of the lane change.

When acceleration of the moving body 10 is performed in the first acceleration/deceleration control performed before the lane change is started and the lane change that has been started is then suspended, the travel control section 60 can perform control to accelerate the moving body 10 in the first acceleration/deceleration control that is performed after the suspension of the lane change.

Figure 2A:
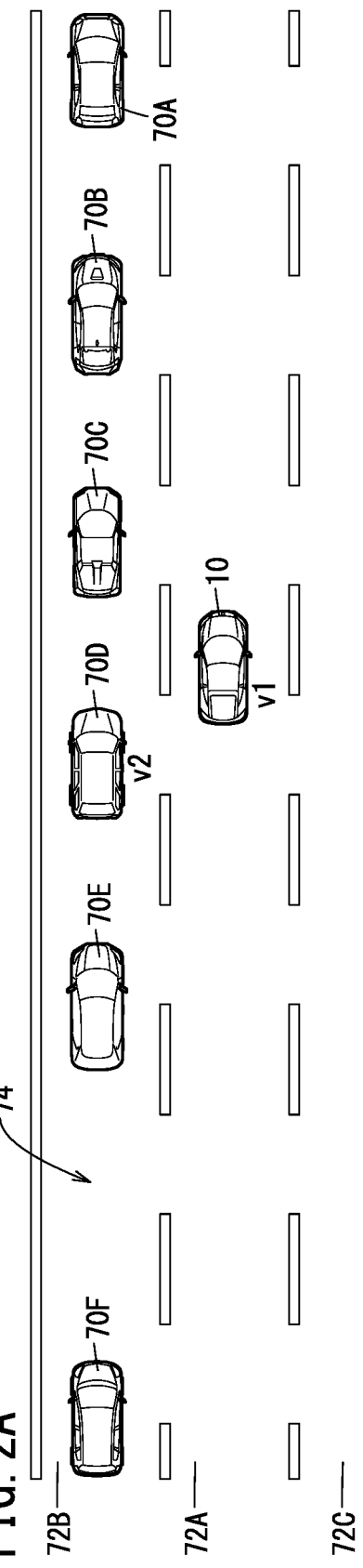
FIGS. 2A and 2B are diagrams showing examples of travel lanes.
Figure 2B:
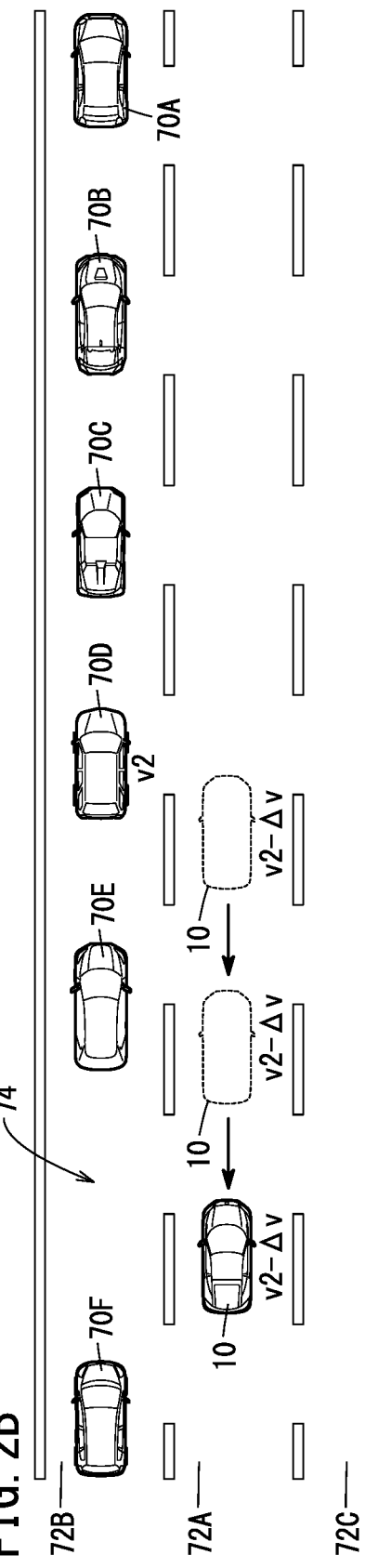

FIGS. 2A and 2B are diagrams showing examples of travel lanes. The first lane 72A, the second lane 72B, and a third lane 72C are shown in FIGS. 2A and 2B. When describing the lanes in general, the reference numeral 72 is used, and when describing the lanes individually, the reference numerals 72A to 72C are used. The second lane 72B is an adjacent lane positioned on one side of the first lane 72A. The third lane 72C is an adjacent lane positioned on the other side of the first lane 72A. In the examples shown in FIGS. 2A and 2B, the moving body 10 is travelling in the first lane 72A. In the examples shown in FIGS. 2A and 2B, other moving bodies 70A to 70F are travelling in the second lane 72B. When describing the moving bodies in general, the reference numeral 70 is used, and when describing the moving bodies individually, the reference numerals 70A to 70F are used. Here, an example is described of a case in which the moving body 10 must make a lane change from the first lane 72A to the second lane 72B in order to arrive at the destination. In the example shown in FIG. 2A, the plurality of other moving bodies 70 are travelling parallel to the moving body 10. Furthermore, there is an empty space 74 between the other moving body 70E and the other moving body 70F. This empty space 74 is positioned farther backward than the position of the moving body 10. Here, an example is described of a case in which the second lane 72B is positioned on the left side of the first lane 72A relative to the progression direction and the third lane 72C is positioned on the right side of the first lane 72A relative to the progression direction, but the present invention is not limited to this. Instead, the second lane 72B may be positioned on the right side of the first lane 72A relative to the progression direction and the third lane 72C may be positioned on the left side of the first lane 72A relative to the progression direction. Here, an example is described of a case in which the other moving bodies 70 are other vehicles, but the present invention is not limited to this. The other moving bodies 70 may be robots or the like.

In the state shown in FIG. 2A, since there is no empty space 74 close to the moving body 10, the judging section 61 denies the lane change of the moving body 10 from the first lane 72A to the second lane 72B. When the lane change of the moving body 10 from the first lane 72A to the second lane 72B is denied by the judging section 61, the travel control section 60 performs control such as described below. Specifically, in such a case, as shown in FIG. 2B, the travel control section 60 performs the first acceleration/deceleration control to increase or decrease the velocity v1 of the moving body 10 according to the velocity v2 of the other moving bodies 70 travelling in the second lane 72B. Here, an example is described of a case in which the velocity v1 of the moving body 10 is decreased in a state where the velocity v1 of the moving body 10 is set to be greater than the velocity v2 of the other moving bodies 70 travelling in the second lane 72B. The travel control section 60 controls the velocity v1 of the moving body 10 to become less than the velocity v2 of the other moving bodies 70 travelling in the second lane 72B by the prescribed velocity difference $\Delta v$. That is, the velocity of the moving body 10 is changed to $v2-\Delta v$. When the velocity of the moving body 10 is set to $v2-\Delta v$ while the other moving bodies 70 are travelling at the velocity v2, the moving body 10 gradually moves backward relative to the other moving bodies 70. Since the moving body 10 is moving backward relative to the other moving bodies 70, a state can be realized in which the empty space 74 positioned between the other moving body 70E and the other moving body 70F is adjacent to the moving body 10. When such a state is realized, the judging section 61 approves the lane change of the moving body 10 from the first lane 72A to the second lane 72B. When the lane change of the moving body 10 from the first lane 72A to the second lane 72B is approved by the judging section 61, the lane change control section 62 performs the lane change of the moving body 10 from the first lane 72A to the second lane 72B.

Figure 3:
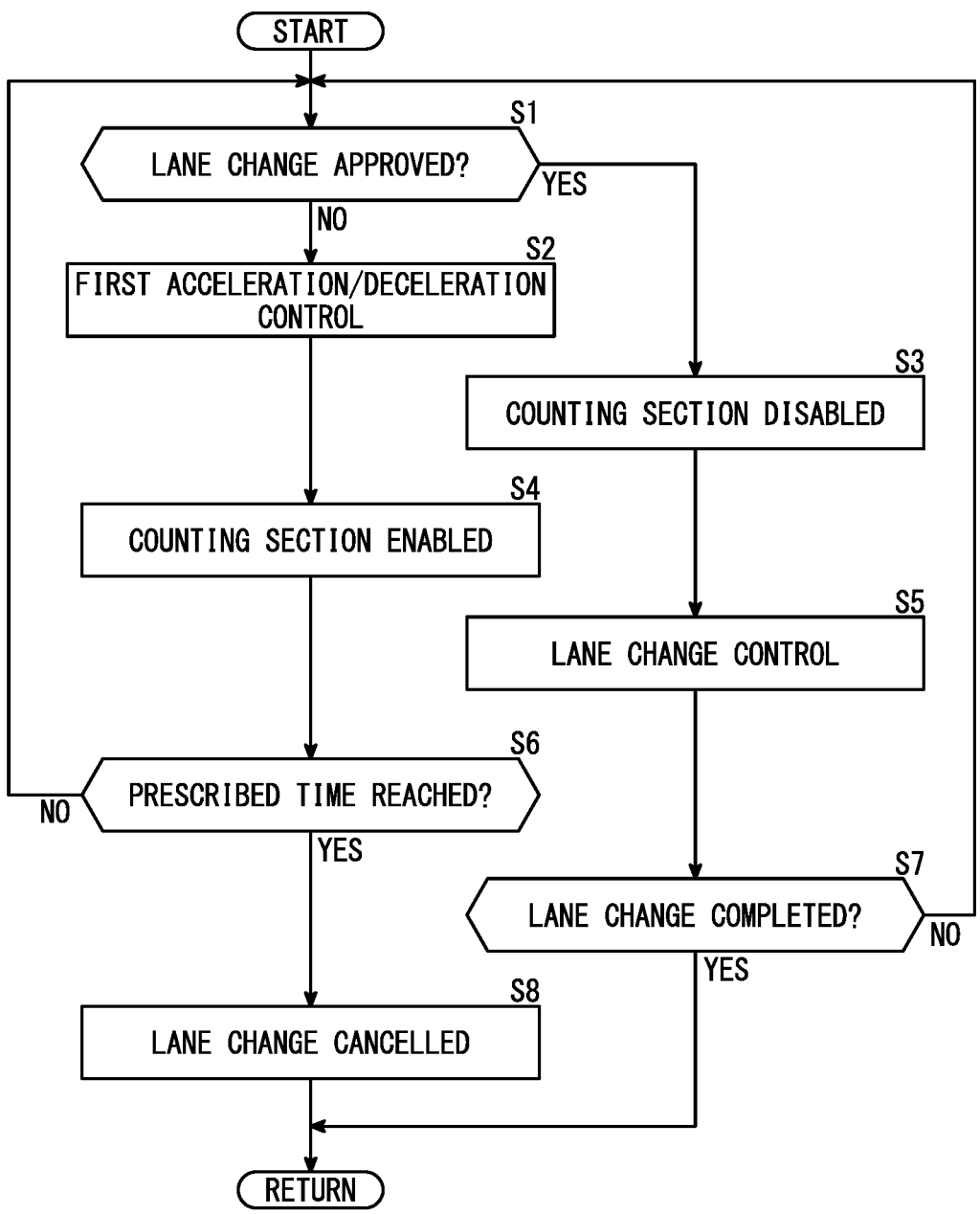
FIG. 3 is a flow chart showing an example of an operation of the moving body control apparatus according to an embodiment.

FIG. 3 is a flow chart showing an example of an operation of the moving body control apparatus according to the present embodiment. An operation performed when changing lanes is shown in FIG. 3.

At step S1, the judging section 61 judges whether to approve the lane change from the first lane 72A to the second lane 72B. If the lane change control is currently being performed, a judgment as to whether it is possible to continue this lane change is made at step S1. If the lane change from the first lane 72A to the second lane 72B is denied (NO at step S1), the process moves to step S2. If the lane change from the first lane 72A to the second lane 72B is approved (YES at step S1), the process moves to step S3.

At step S2, the travel control section 60 performs the first acceleration/deceleration control, which is control to increase or decrease the velocity v1 of the moving body 10 travelling in the first lane 72A according to the velocity v2 of the other moving bodies 70 travelling in the second lane 72B. For example, the velocity of the moving body 10 is set to $v2-\Delta v$. Instead, the velocity of the moving body 10 may be set to $v2+\Delta v$. After this, the process moves to step S4.

At step S3, the control section 57 sets the counting section 66 to the disabled state. If the counting section 66 is already in the disabled state, this disabled state is maintained. After this, the process moves to step S5.

At step S4, the control section 57 sets the counting section 66 to the enabled state. If the counting section 66 is already in the enabled state, this enabled state is maintained.

At step S5, the lane change control section 62 performs the lane change of the moving body 10 from the first lane 72A to the second lane 72B. If lane change control is currently being performed, this lane change control is continued. After this, the process moves to step S7.

At step S6, the control section 57 judges whether the elapsed time counted by the counting section 66 has reached the prescribed time. If the elapsed time has reached the prescribed time (YES at step S6), the process moves to step S8. If the elapsed time has not reached the prescribed time (NO at step S6), the operations from step S1 onward are repeated.

At step S7, the lane change control section 62 judges whether the lane change has been completed. If the lane change has been completed (YES at step S7), the process shown in FIG. 3 ends. If the lane change has not been completed (NO at step S7), the processing from step S1 onward is repeated.

At step S8, the lane change control section 62 cancels the lane change. When the lane change has been cancelled, the process shown in FIG. 3 ends.

In this way, according to the present embodiment, when the lane change of the moving body 10 from the first lane 72A to the second lane 72B is denied, the first acceleration/deceleration control to increase or decrease the velocity v1 of the moving body 10 according to the velocity v2 of the other moving bodies 70 travelling in the second lane 72B is performed. Since the velocity v1 of the moving body 10 is increased or decreased according to the velocity v2 of the other moving bodies 70 travelling in the second lane 72B, the moving body 10 can quickly become adjacent to the empty space 74 present in the second lane 72B. Therefore, according to the present embodiment, it is possible to provide the moving body control apparatus 12 that can accurately perform a lane change.

Preferred embodiments of the present invention are described above, but the present invention is not limited to the above-described embodiments, and various alterations can be adopted therein without departing from the scope of the present invention.

The following is a summary of the embodiments described above.

A moving body control apparatus (12) comprises a vicinity information acquiring section (58) that acquires vicinity information of a moving body (10); a travel control section (60) that controls travel of the moving body based on the vicinity information; a judging section (61) that judges whether to approve or deny a lane change of the moving body from a first lane (72A) in which the moving body is travelling to a second lane (72B) adjacent to the first lane, based on the vicinity information; and a lane change control section (62) that performs the lane change of the moving body from the first lane to the second lane, if the lane change of the moving body from the first lane to the second lane is approved, wherein the travel control section performs first acceleration/deceleration control to accelerate or decelerate the moving body according to a velocity (v2) of another moving body (70) travelling in the second lane, if the lane change of the moving body from the first lane to the second lane is denied. According to such a configuration, if the lane change of the moving body from the first lane to the second lane is denied, the first acceleration/deceleration control to increase or decrease the velocity of the moving body according to the velocity of the other moving body travelling in the second lane is performed. Therefore, since the velocity of the moving body is increased or decreased according to the velocity of the other moving body travelling in the second lane, the moving body can quickly become adjacent to the empty space present in the second lane. Therefore, according to such a configuration, it is possible to provide the moving body control apparatus that can accurately perform a lane change.

In the first acceleration/deceleration control, a velocity (v1) of the moving body may be controlled to become less than or greater than the velocity of the other moving body travelling in the second lane, by a prescribed velocity difference (Δv).

The judgement as to whether to approve or deny the lane change may be performed by the judging section while the first acceleration/deceleration control is being performed by the travel control section.

The moving body control apparatus may further comprise a searching section (64) that searches for an empty space (74), for making the lane change of the moving body from the first lane to the second lane, based on the vicinity information, and the judging section may judge whether to approve or deny the lane change of the moving body from the first lane to the second lane based on a result of the search for the empty space.

If the lane change of the moving body from the first lane to the second lane is approved, the lane change control section may perform second acceleration/deceleration control to position the moving body in the detected empty space.

The moving body control apparatus may further comprise a counting section (66) that accumulates an elapsed time; the counting section may start a count when the first acceleration/deceleration control is started, stop the count when the lane change is started, and restart the count when the first acceleration/deceleration control is restarted; and, when the accumulated elapsed time reaches a prescribed time, lane change control section may cancel the lane change of the moving body from the first lane to the second lane. According to such a configuration, the lane change can be cancelled at a favorable timing.

If deceleration of the moving body is performed in the first acceleration/deceleration control performed before the lane change is started and the lane change that has been started is then suspended, the travel control section may decelerate the moving body in the first acceleration/deceleration control performed after the suspension of the lane change; and if acceleration of the moving body is performed in the first acceleration/deceleration control performed before the lane change is started and the lane change that has been started is then suspended, the travel control section may perform control to accelerate the moving body in the first acceleration/deceleration control performed after the suspension of the lane change. According to such a configuration, since it is possible to prevent the behavior of the moving body 10 from differing significantly before and after suspension of the lane change, it is possible improve the comfort of the ride.

A moving body comprises the moving body control apparatus such as described above.

A moving body control method comprises a travel control step (S2) of controlling travel of a moving body based on vicinity information of the moving body; a judgment step (S1) of judging, based on the vicinity information of the moving body, whether to approve or deny a lane change of the moving body from a first lane in which the moving body is travelling to a second lane adjacent to the first lane; and a lane change control step (S5) of performing the lane change of the moving body from the first lane to the second lane, if the lane change of the moving body from the first lane to the second lane is approved in the judging step, wherein, in the travel control step, first acceleration/deceleration control to accelerate or decelerate the moving body according to a velocity of another moving body travelling in the second lane is performed, if the lane change of the moving body from the first lane to the second lane is denied in the judging step.

What is claimed is:

1. A moving body control apparatus comprising one or more processors that execute computer-executable instructions stored in a memory, wherein
   the one or more processors execute the computer-executable instructions to cause the moving body control apparatus to:
   acquire vicinity information of a moving body;
   control travel of the moving body based on the vicinity information;
   judge whether to approve or deny a lane change of the moving body from a first lane in which the moving body is travelling to a second lane adjacent to the first lane, based on the vicinity information;
   perform the lane change of the moving body from the first lane to the second lane, if the lane change of the moving body from the first lane to the second lane is approved; and
   perform first acceleration/deceleration control to accelerate or decelerate the moving body according to a velocity of another moving body travelling in the second lane, if the lane change of the moving body from the first lane to the second lane is denied.

2. The moving body control apparatus according to claim 1, wherein
   in the first acceleration/deceleration control, a velocity of the moving body is controlled to become less than or greater than the velocity of the another moving body travelling in the second lane, by a prescribed velocity difference.

3. The moving body control apparatus according to claim 1, wherein
   judgement as to whether to approve or deny the lane change is performed while the first acceleration/deceleration control is being performed.

4. The moving body control apparatus according to claim 1, wherein
   the one or more processors cause the moving body control apparatus to search for an empty space that allows making the lane change of the moving body from the first lane to the second lane, based on the vicinity information, and
   the one or more processors cause the moving body control apparatus to judge whether to approve or deny the lane change of the moving body from the first lane to the second lane based on a result of the search for the empty space.

5. The moving body control apparatus according to claim 4, wherein
   if the lane change of the moving body from the first lane to the second lane is approved, the one or more processors cause the moving body control apparatus to perform second acceleration/deceleration control to position the moving body in the detected empty space.

6. The moving body control apparatus according to claim 1, wherein
   the one or more processors cause the moving body control apparatus to accumulate an elapsed time,
   the one or more processors cause the moving body control apparatus to start a count when the first acceleration/deceleration control is started, stop the count when the lane change is started, and restart the count when the first acceleration/deceleration control is restarted, and when the accumulated elapsed time reaches a prescribed time, the one or more processors cause the moving body control apparatus to cancel the lane change of the moving body from the first lane to the second lane.

7. The moving body control apparatus according to claim 1, wherein if deceleration of the moving body is performed in the first acceleration/deceleration control performed before the lane change is started and the lane change that has been started is then suspended, the one or more processors cause the moving body control apparatus to perform control to decelerate the moving body in the first acceleration/deceleration control performed after suspension of the lane change, and if acceleration of the moving body is performed in the first acceleration/deceleration control performed before the lane change is started and the lane change that has been started is then suspended, the one or more processors cause the moving body control apparatus to perform control to accelerate the moving body in the first acceleration/deceleration control performed after suspension of the lane change.

8. A moving body comprising a moving body control apparatus, the moving body control apparatus comprising one or more processors that execute computer-executable instructions stored in a memory, wherein the one or more processors execute the computer-executable instructions to cause the moving body control apparatus to:

acquire vicinity information of a moving body;

control travel of the moving body based on the vicinity information;

judge whether to approve or deny a lane change of the moving body from a first lane in which the moving body is travelling to a second lane adjacent to the first lane, based on the vicinity information;

perform the lane change of the moving body from the first lane to the second lane, if the lane change of the moving body from the first lane to the second lane is approved; and perform first acceleration/deceleration control to accelerate or decelerate the moving body according to a velocity of another moving body travelling in the second lane, if the lane change of the moving body from the first lane to the second lane is denied.

9. A moving body control method comprising:

controlling travel of a moving body based on vicinity information of the moving body;

judging, based on the vicinity information of the moving body, whether to approve or deny a lane change of the moving body from a first lane in which the moving body is travelling to a second lane adjacent to the first lane; and performing the lane change of the moving body from the first lane to the second lane, if the lane change of the moving body from the first lane to the second lane is approved in the judging as to whether to approve or deny the lane change, wherein in the controlling of the travel, first acceleration/deceleration control to accelerate or decelerate the moving body according to a velocity of another moving body travelling in the second lane is performed, if the lane change of the moving body from the first lane to the second lane is denied in the judging as to whether to approve or deny the lane change.

* * * * *